(12) United States Patent
DeVolpi

(10) Patent No.: US 6,733,160 B2
(45) Date of Patent: May 11, 2004

(54) SHUTTERING STROBING ONCOMING HEADLIGHT GLARE REDUCTION SYSTEM

(76) Inventor: Dean R. DeVolpi, 806 Buchanan #115-233, Boulder City, NV (US) 89005

( * ) Notice: Subject to any disclaimer, the term of this patent is extended or adjusted under 35 U.S.C. 154(b) by 3 days.

(21) Appl. No.: 10/163,231

(22) Filed: Jun. 4, 2002

(65) Prior Publication Data

US 2002/0196635 A1 Dec. 26, 2002

Related U.S. Application Data

(60) Provisional application No. 60/295,973, filed on Jun. 4, 2001.

(51) Int. Cl.7 .............................. B60Q 1/00; F21V 21/29
(52) U.S. Cl. ........................ 362/465; 362/466; 362/464; 315/82
(58) Field of Search ................................ 362/464, 465, 362/466; 315/82

(56) References Cited

U.S. PATENT DOCUMENTS

| | | | |
|---|---|---|---|
| 3,952,253 A | 4/1976 | DeVolpi | |
| 4,201,450 A | 5/1980 | Trapani | |
| 4,443,057 A | 4/1984 | Bauer | |
| 5,015,086 A | 5/1991 | Okaue | |
| 5,478,239 A | 12/1995 | Fuerst | |
| 6,049,171 A * | 4/2000 | Stam et al. | 315/82 |
| 6,056,397 A | 5/2000 | Berlad | |
| 6,056,424 A | 5/2000 | DiNunzio | |
| 6,144,158 A | 11/2000 | Beam | |
| 6,208,463 B1 | 3/2001 | Hansen | |
| 6,247,820 B1 | 6/2001 | Van Order | |
| 6,299,231 B1 | 10/2001 | Reitz | |
| 6,299,316 B1 | 10/2001 | Fletcher | |
| 6,578,993 B2 * | 6/2003 | Kobayashi et al. | 362/466 |

* cited by examiner

Primary Examiner—Sandra O'Shea
Assistant Examiner—James W Cranson, Jr.

(57) ABSTRACT

An oncoming headlight glare reduction system using a controlled shuttering of a shield and the strobing of the headlight.

6 Claims, 2 Drawing Sheets

SHUTTERING STROBING ONCOMING HEADLIGHT GLARE REDUCTION SYSTEM

I claim the benefit of provisional patent No. 60/295,973 filed on Jun. 4, 2001.

BACKGROUND OF THE INVENTION

A product that will automatically minimize severe oncoming headlight glare. Oncoming headlight glare is caused by the incidence of oncoming light energy on the drivers eyes preventing or minimizing the driver from being able to make use of his own headlight energy, sometimes causing temporary blindness. The goal of this technology is to keep constant or minimize the loss of the amount of data (light reflected back) to the driver from his own light source/ headlights while decreasing the amount of light energy that the oncoming car headlight is incident on the drivers eyes that is known as oncoming headlight glare.

SUMMARY OF THE INVENTION

We deal with sunlight brightness in a respect in two fashions, one a complete block with a visor and a partial block/filter, sunglasses. We have learned how to use visors that virtually block all light/information. They work well for our use; yet require a learned behavior because they are a complete block. We do not use this at night because of the fact that there is not enough peripheral light energy covering other areas to aid in navigation. We also use sunglasses during the day to combat sunlight, yet we have also found that putting them on at night is also not practical because we lose all or to much information. To date as a headlight comes directly at us we tend to shut out everything and even migrate directly at the source in some cases.

Another type of headlight glare that causes drivers a problem is car headlights coming from the rear, this light comes into the rearview mirror and is reflected to the driver. There are many patents that address this problem. Use of mirrors with contrasting displays have been utilized in art like U.S. Pat. No. 4,443,057 to Bauer which is incorporated herein by reference. Like U.S. Pat. No. 6,247,820 to VanOrder, which is incorporated herein by reference Like U.S. Pat. No. 6,299,316 to Fletcher which is incorporated herein by reference. These and many of the others employ active methods. These are very effective at their purpose of reducing the light from behind, where the amount of data here is not critical. Where a reduction in total energy making it to the driver is acceptable and a good product. We typically just need to know if a car is far or close to us at night. Whereas we do not want to decrease our vision data in front of us. Oncoming headlights can prevent us from being able to see in the direction the car is moving, which the more data/input our brain has the better our driving ability will be.

There are several patents that are trying to deal with oncoming headlight glare (OHG). Some try to filter with sunglass technology in certain regions of the windshield which reduces the total information coming back to the driver, Like U.S. Pat. No. 6,056,397 to Berlad which is incorporated herein by reference. This is a passive solution that filters the light all the time. This has problems like, various height persons and no matter what it does reduce the total amount of data/energy from the drivers own headlights that make it back to the driver.

Attempts at stopping OHG have included polarizers another passive method, Like U.S. Pat. No. 6,208,463 to Hansen which is incorporated herein by reference; Like U.S. Pat. No. 6,299,231 to Reitz which is incorporated herein by reference this again reduces the total amount of light energy that reaches the drivers eyes. Which in turn gives less data/energy to the driver to dive with.

Adaptive headlights automate the brightness of high beams Like U.S. Pat. No. 6,144,158 to Beam which is incorporated herein by reference, that do not reduce the OHG by normal headlights, just decrease the drivers headlights from being on high beam. Like U.S. Pat. No. 6,049, 171 to Stam which is incorporated herein by reference also just reduces the drivers ability to blind the other drivers with his brights on.

Like U.S. Pat. No. 6,056,424 to DiNunzio which is incorporated herein by reference addresses glare reduction by putting a light source inside the car to reduce the dilated pupil. This in effect may mitigate severe blindness as the oncoming car approaches but it will an average decrease the total amount of information the brain receives to make decisions from the outside of the vehicle due to the smaller dilation of the eye.

Popular technologies/products that use the time shutter principle are motion pictures, cameras, TV's, and so on. Shuttering principles have been used for years in conjunction with external energy flashes, they are used in consumer cameras for years known as flash, and are typically one time flashes. Like U.S. Pat. No. 3,952,253 to Dr. Alexander DeVolpi which is incorporated herein by reference also uses a strobing neon light source to match the shuttering camera (high-speed framing camera) "seeing/recording" time as a continuous strobe recording at very high speeds for Nuclear Reactors.

Glasses that use shuttering priciples are Like U.S. Pat. No. 5,478,239 to Fuerst which is incorporated herein by reference uses LCD glasses that shutter clear and block light to allow athletes to train with limited optical input to increase the users real life proficiencies. Like U.S. Pat. No. 4,201,450 to Trapani which is incorporated herein by reference uses a electro-optic shield to limit the amount of light to the wearer's eyes, he used glasses, helmets, goggles welding plates and so on. Like U.S. Pat. No. 5,015,086 to Okaue which is incorporated herein by reference used LCD glasses to have block the sun and have a switch to have two levels.

DESCRIPTION OF THE PREFERRED EMBODIMENT

In principle the Shuttering Strobing Oncoming Headlight Glare Reduction System is very simple, as with TV's that appear to be on constantly to the human. We put an active shield in front of the driver. The shield is capable of allowing light energy to pass through it and with a control signal able to prevent light or severely restrict light energy from passing through. At the same time we strobe the energy/light source/ headlight to match or overlap the clear time of the shield. We do this at various frequencies that the net effect is to the driver it does not seem like the lights are flashing, similar to how the TV or AC lighting does not look like it is flashing. As one example but not limiting to any specific duty cycle or frequency we do this at a 50% duty cycle. What we then do is double the output of the light source from say 50 watts to 100 watts at 50% duty cycle averages today's legal required limit of 50 watts to maintain the same total of energy output in a time period of one minute. Thus from the car that is approaching our vehicle the 100 watt headlight does not seem any brighter that would cause any extra problems. The shield is synchronized with the 100 Watt headlight to be in the clear phase when the headlight is in the on phase. This allows for the total amount of energy output that is reflected off the items in front of the car by the 100 Watt bulbs to reflect back and be incident on the drivers eyes because the shield is in the clear mode. In the other phase of the 50% duty cycle the shield turns dark. This blocks/absorbs 50% of the light energy put out by the oncoming cars headlights to reduce the blindness caused by the oncoming headlights.

If the oncoming headlights have the same system we in theory, can eliminate 100% of the oncoming headlights if they are in opposite phase. This can be accomplished by having the two cars communicate in some manner. Methods that they could do this is auto shift once the first one senses energy from the second, energy could be light source, they could have a coded pattern in their flashing, or they could have second energy light source like IR to communicate or with RF energy signals to send data vehicle to vehicle which allows us to co-ordinate their synchronization pattern, sound energy could also be used. Ideally there would also be bi-directional communications between the vehicles with the two energy receivers and senders.

This requires energy sensors to accept the data from the oncoming vehicle. We could also use magnetic reading sensors to synchronize phases or including GPS sensors, input where we do not have to sense the opposing vehicle.

The frequency that the system will be working at will be around 50 HZ to possible as high as 300 HZ or higher.

There are several ways that am embedded signal can be sent, it can be sent by missing several periods of data then sending a few patterns to say I am the sync vehicle like 4 periods of no data. The other will acknowledge by sending a confirming pattern of two highs and two lows and two highs for example.

Another method would be to send several longer duty cycle periods than normal. In other words we send 100 normal ones which we base our transmission length and then we send several long duty cycles to be our code that we are the sync vehicle and the other is the passive.

Another method is to shift the frequency to a different frequency say instead of 60 HZ we move to 61 HZ to say we are the sync, and the other one move to 59 HZ to acknowledge.

Another method is within the 50 HZ signal to send a data stream at 300 KHZ for example that carries data to sync the two vehicles.

Another possibility is short range RF or IR between the cars.

If two cars are side by side approaching another car, the car that receives light first will notify the others it is the sync vehicle. The oncoming cars yield to this and shift accordingly. The way we know who was first is the minute it receives the light it gives a time stamp to that arrival time, and will transmit how long it took before the other car acknowledged the original signal. Thus if it tool 900 transmissions it will send this information to the other car and his count is 500 then he yields to the 900 flashes sent.

With magnetic readings we always give the vehicle in the North leading sync right away. And we have a weighted scale for travel in other directions.

The shield is an electronically active or electro-optic device like LCD, electrochromic, that can be transmissive and in a second mode reflective/absorb the light energy to prevent it from passing through. The shield could be the windshield, part of the windshield, glasses, visors, motor-cycle visors. Control signals can be just on-off state of power or could be coded signals from controller.

Energy output devices could include and not restricted to various types of bulbs, Xenon, Halogen, neon, Incandescent, LED, High Pressure Sodium and so on that put out visible light significant energy for illumination. The duty cycle may have to be averaged to match the rise and or fall time of the light energy output because the light sources tend to linger on and have a distinctive rise time before it is on.

The microcontroller is capable of providing a signal that can drive the headlight via a transistor type circuit or relay type circuit or motor signal

DESCRIPTION OF THE DRAWINGS

Figure 1:
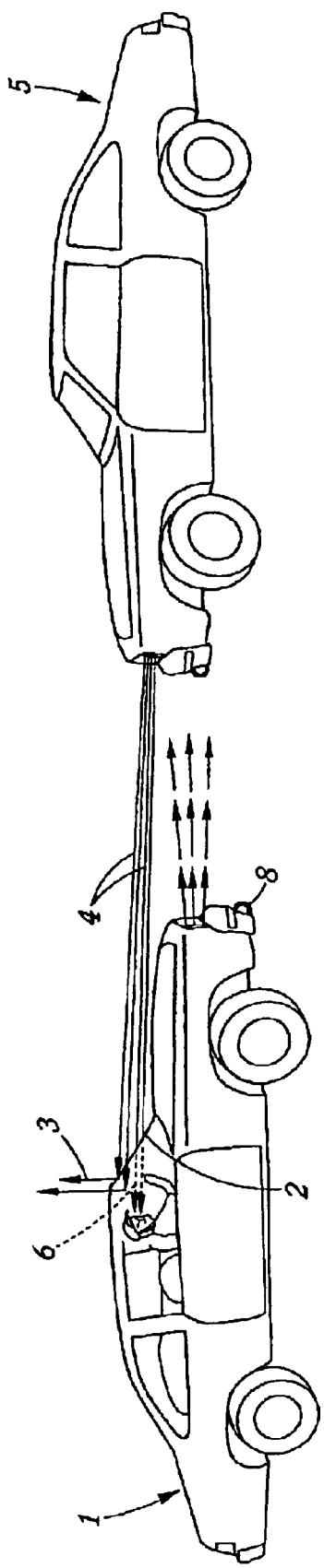
FIG. 1 Oncoming car with normal headlights

In FIG. 1 we have driven car 1, that has a shield 2 that reflects 3 as an example 50% of the continuous light 4, from oncoming car 5. The shield 2 allows fifty percent of the continuous light 6 to penetrate the shield 2. The driven car 1 emits an energy output 7 that has frequency and duty cycle. The energy transmitter/sensor 8 accepts energy and synchronizes the timing of the energy output 7 and the shield 2.

Figure 2:
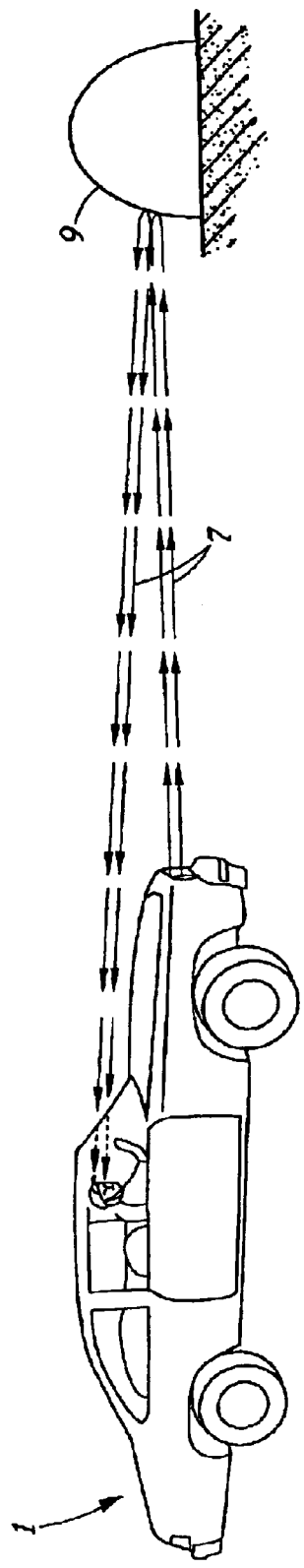
FIG. 2 Reflected strobing light incident on the driver

In FIG. 2 driven cars 1, energy output 7 reflects off the obstacle 9 to pass completely through shield 2 because it is synchronized with the energy output 7.

Figure 3:
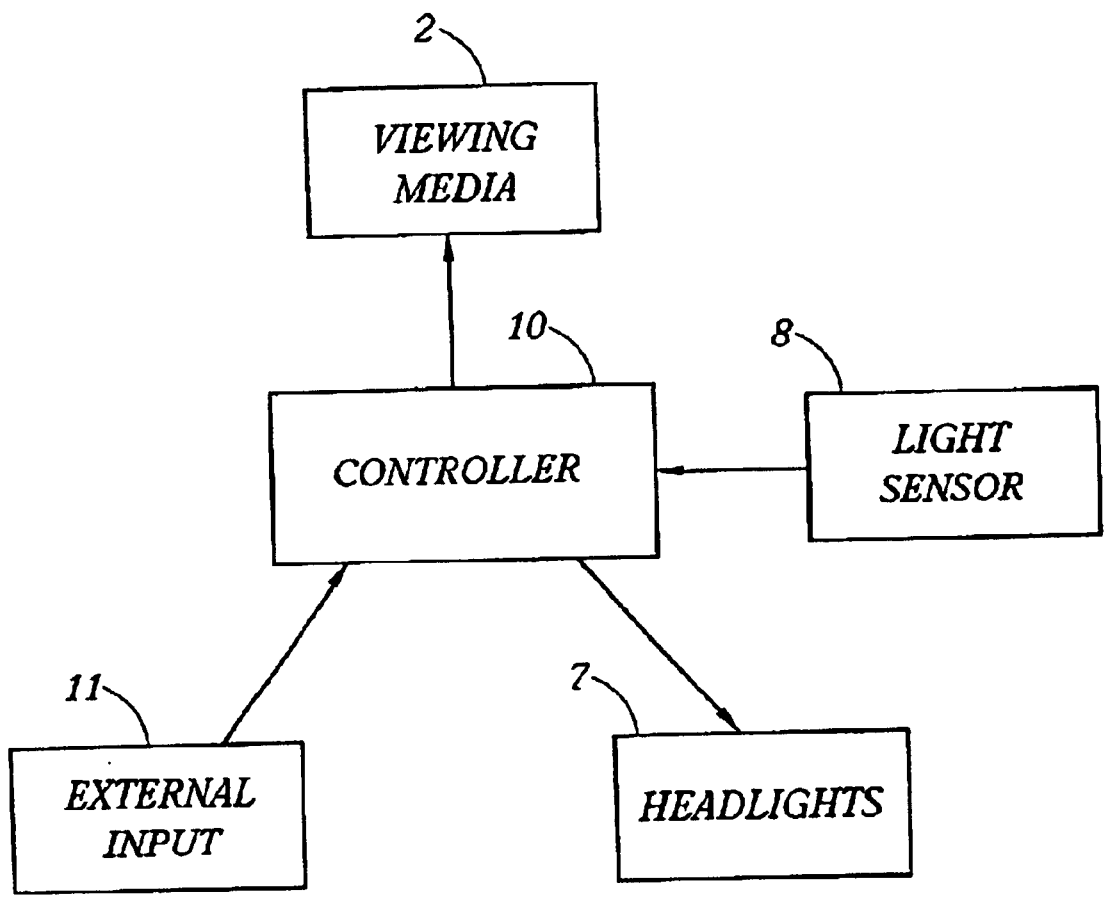
FIG. 3 Block diagram of the system.

In FIG. 3 we have a block diagram whereby the controller 10 sends signals to the viewing media or the shield 2. The controller 10 also has a light sensor 8 that sends signals to the controller when it receives energy from oncoming headlights 4. The controller 10 sends signals to the headlights that are the energy output device 7. External input 11 receives data from other sources and communicates this to the controller 10 for controller to determine synchronization of all functions.

What I claim is:

1. An oncoming headlight glare reduction device for vehicles that has a means of generating a control signal to control an energy shield in phase with an energy output device that has a fixed duty cycle.

2. An energy shield defined in claim 1 that changes state via said control signal.

3. An oncoming headlight glare reduction device as defined in claim 1 that has an energy sensor device that that receives information from oncoming vehicle that allows co-ordination/synchronization of the phase of the said energy output device with respect to the oncoming vehicle.

4. An oncoming headlight glare reduction device as defined in claim 1 that has an energy transmission device that transmits information from vehicle that allows co-ordination/synchronization of the phase of the said energy output device with respect to the oncoming vehicle.

5. An oncoming headlight glare reduction device as in claim 1 that has an input from Magnetic readings.

6. An oncoming headlight glare reduction device as in claim 1 that has an input from Global Positioning Systems.

* * * * *